US009563288B2

(12) United States Patent
Kuwata (10) Patent No.: US 9,563,288 B2
(45) Date of Patent: Feb. 7, 2017

(54) PEN-TYPE INPUT DEVICE AND ELECTRONIC INFORMATION BOARD SYSTEM

(71) Applicant: Masahiro Kuwata, Tokyo (JP)

(72) Inventor: Masahiro Kuwata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/170,767

(22) Filed: Feb. 3, 2014

(65) Prior Publication Data

US 2014/0218344 A1 Aug. 7, 2014

(30) Foreign Application Priority Data

Feb. 4, 2013 (JP) ................. 2013-019209

(51) Int. Cl.
*G06F 3/0354* (2013.01)
*G06F 3/041* (2006.01)
*G06F 3/042* (2006.01)

(52) U.S. Cl.
CPC .......... *G06F 3/03545* (2013.01); *G06F 3/041* (2013.01); *G06F 3/0421* (2013.01)

(58) Field of Classification Search
CPC .................................. G06F 3/03545
USPC ......... 345/173–179; 178/18.01–18.11, 19.01
See application file for complete search history.

(56) References Cited

U.S. PATENT DOCUMENTS

| | | | |
|---|---|---|---|
| 6,276,861 B1 * | 8/2001 | Tachikawa ................ | 401/240 |
| 6,429,856 B1 | 8/2002 | Omura et al. | |
| 8,576,203 B2 | 11/2013 | Nakata et al. | |
| 2008/0257613 A1 * | 10/2008 | Katsurahira ............... | 178/19.04 |
| 2010/0150638 A1 * | 6/2010 | Namiki .................... | B43K 7/12 401/99 |
| 2011/0298709 A1 * | 12/2011 | Vaganov ...................... | 345/158 |
| 2012/0086674 A1 | 4/2012 | Kim et al. | |
| 2013/0040856 A1 * | 2/2013 | Mirkin ................. | G03F 7/0002 506/11 |

FOREIGN PATENT DOCUMENTS

| | | |
|---|---|---|
| JP | 62-032444 U | 2/1987 |
| JP | 10-027059 | 1/1998 |

(Continued)

OTHER PUBLICATIONS

Extended European search report dated Nov. 28, 2014.
Japanese Office Action dated Oct. 25, 2016.

*Primary Examiner* — Kent Chang
*Assistant Examiner* — Scott Au
(74) *Attorney, Agent, or Firm* — IPUSA, PLLC (57) ABSTRACT

A pen-type input device includes a body shaped like a pen; a penpoint movable portion inserted into a front end recess included in the body; and a transmission part which transmits a transcription detecting signal of a contact position when the penpoint movable portion is caused to touch a display face of an electronic information board, wherein the penpoint movable portion includes a penpoint member, which is made of an elastic member and includes a front end portion caused to touch the display face, and a penpoint holding portion, which has a rigidity higher than that of the penpoint member, fits around an outer periphery of a base end portion of the penpoint member, and holds the penpoint member so as to prevent deformation of the outer periphery of the base end portion of the penpoint member.

12 Claims, 9 Drawing Sheets

(56) References Cited

FOREIGN PATENT DOCUMENTS

| | | |
|---|---|---|
| JP | 11-259227 | 9/1999 |
| JP | 2002-509308 | 3/2002 |
| JP | 2005-043992 | 2/2005 |
| JP | 4627781 | 2/2011 |
| JP | 4840891 | 12/2011 |
| JP | 2012-125979 | 7/2012 |
| WO | WO99/31635 A1 | 6/1999 |

* cited by examiner

PEN-TYPE INPUT DEVICE AND ELECTRONIC INFORMATION BOARD SYSTEM

BACKGROUND OF THE INVENTION

1. Field of the Invention

The present invention relates to a pen-type input device and electronic information board system.

2. Description of the Related Art

In recent years, electronic information boards such as a so-called electronic blackboard or a so-called interactive whiteboard (IWB) have been developed. For example, as disclosed in Patent Document 1, one type of the electronic information board includes an image display device having a large screen (the diagonal dimension is, for example, 40 inches to 60 inches) using a flat panel such as a liquid crystal panel or a plasma panel, a coordinate detection device (a touch panel) which detects the coordinate of a position where a display face is touched, and a control device which causes various images (images containing a character, a number, or a figure) written on the display face of the image display device to be displayed based on coordinate data output from the coordinate detection device.

Further, it is possible to enlarge and display an image displayed by a display of a personal computer by connecting the electronic information board with a personal computer. This electronic information board can be used for presentation in a meeting.

Further, the system of this electronic information board has a function of superposing a graphic of a handwritten character written by a pen-type input device (an object to be detected) on an image displayed on a display face by causing the pen-type input device to touch a touch panel and a function of taking a screen of a personal computer into and superposing and drawing graphics written by the pen-type input device on the screen.

For example, Patent Document 2 discloses a pen-type input device including a writing unit which transmits a transcription detecting signal by detecting a transcribing operation when a penpoint made of, for example, an elastic member is moved while the penpoint touches a touch panel.

In a case where the pen-type input device is used to write on an electronic information board, the pen-type input device is moved so as to go along a display surface of the electronic information board while the penpoint touches the display surface of the electronic information board, and therefore the coordinate of the position where the penpoint touches the display surface is detected by an optical sensor and characters and graphic symbols can be written like an ordinary blackboard or whiteboards. Further, the penpoint is made of a material having elasticity and the front end recess of the pen-type input device includes a detection switch for detecting a displacement caused by pressure received by the penpoint from the contacting display unit in order to improve a write feeling at a time of a contact of the penpoint with the display face of the electronic information board. Then, the electronic information board displays the characters and the graphic symbols which are written on the display face based on information of the contact position of the pen-type input device which touches the display face and a signal transmitted from the detection switch of the pen-type input device.

Patent Document 1: Japanese Patent No. 4627781

Patent Document 2: Japanese National Publication of International Patent Application No. 2002-509308

At a time of the transcribing operation using the above pen-type input device, a contact pressure (a compression load) is applied onto the penpoint against the display face. Therefore, the penpoint is compressed by pressure in an axial direction so that an outer peripheral side of the penpoint expands in a radius direction. After repeated applications of the contact pressure onto the penpoint, the shape of the penpoint gradually deforms and finally the outer peripheral side of the penpoint may not return from the expanded state. After the penpoint is deformed onto the outer peripheral side as described above, the deformed part of the penpoint contacts the inner wall of the front end recess of the pen-type input device. Then, a write switch cannot be normally operated. Thus, there occurs a problem that a writing operation using the pen-type input device cannot be recognized.

SUMMARY OF THE INVENTION

Accordingly, embodiments of the present invention provides a novel and useful pen-type input device and an electronic information board system solving one or more of the problems discussed above.

One aspect of the embodiments of the present invention may be to provide a pen-type input device including a body shaped like a pen; a penpoint movable portion inserted into a front end recess included in the body; and a transmission part which transmits a transcription detecting signal of a contact position when the penpoint movable portion is caused to touch a display face of an electronic information board, wherein the penpoint movable portion includes a penpoint member, which is made of an elastic member and includes a front end portion caused to touch the display face, and a penpoint holding portion, which has a rigidity higher than that of the penpoint member, fits around an outer periphery of a base end portion of the penpoint member, and holds the penpoint member so as to prevent deformation of the outer periphery of the base end portion of the penpoint member.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

DETAILED DESCRIPTION OF THE PREFERRED EMBODIMENTS

A description is given below, with reference to the FIG. 1 through FIG. 9B of embodiments of the present invention. Where the same reference symbols are attached to the same parts, repeated description of the parts is omitted.

Reference symbols typically designate as follows:
10: electronic information board system;
20: display unit;
22: display face;
24: touch panel;
28: user PC screen;
60: controller;
100, 400: pen-type input device;
100A, 400A: writing unit;
100B, 400B: eraser unit;
110: pen body;
111: front end;
112: front end recess;
120: penpoint movable portion;
122: penpoint member;
122a: base end portion;
122b: front end portion;
122c: bulging portion;
124: penpoint holding portion;
124a: engaging recess;
124b: pressing portion;
124c: front end side end portion;
124d: wall portion;
130: pen tail movable portion;
140: penpoint detection switch;
142, 152: movable piece;
150: pen tail detection switch;
180: transmission circuit unit;
182: signal input portion;
184: signal processing portion;
186: detection signal transmitting portion;
200: communication line;
202: network socket;
204: network;
210: pen signal receiving unit;
220: controller operation system portion;
230: application part;
231: event signal determining part;
232: image input processing part;
234: image drawing processing part;
236: screen erasing processing part;
238: screen operation processing part;
240: image input device part;
250: touch panel driver part;
300, 310: light emission sensor;
320, 330, 340: reflection plate; and
350: light emission sensor circuit.

(Structure of Electronic Information Board System)

Figure 1:
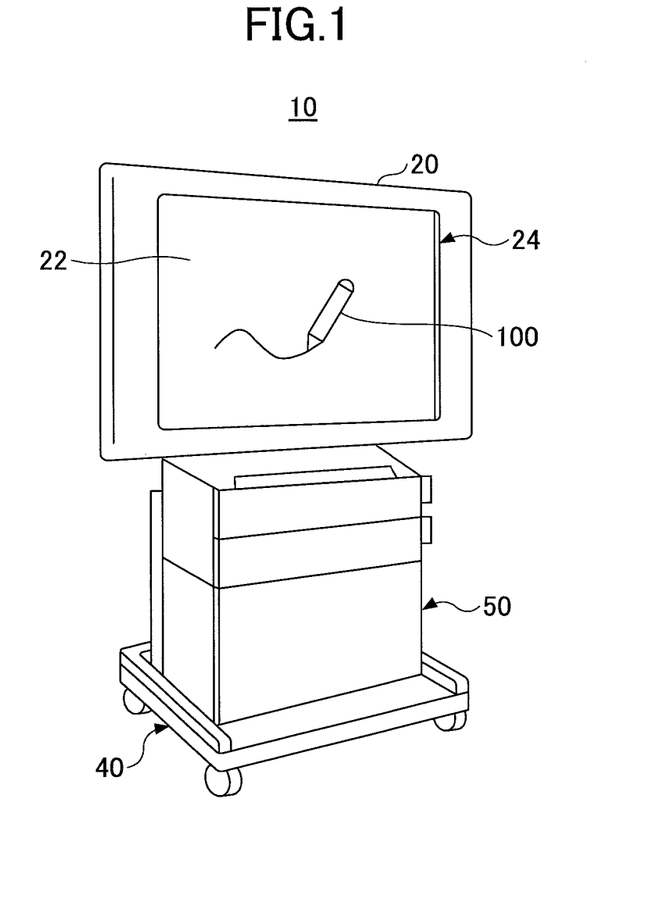
FIG. 1 is a perspective view illustrating an electronic information board system to which a pen-type device of an embodiment of the present invention is applied.

FIG. 1 is a perspective view illustrating an electronic information board system to which a pen-type device of an embodiment of the present invention is applied. Referring to FIG. 1, the electronic information board system 10 includes a display unit 20, a stand 40, and a device accommodating portion 50. The display unit 20 is formed by a flat panel such as a liquid crystal panel or a plasma panel. A display face 22 and a touch panel (a coordinate detecting part) 24 are formed on a front surface of the display unit 20.

Further, a penpoint of a pen-type input device 100, which is dedicated for the electronic information board system 10, can write characters, graphic symbols, or the like onto the display face of the electronic information board system 10.

When the pen-type input device 100 transmits a transcription detecting signal as a wireless signal when the penpoint at one end of the pen-type input device 100 touches the display face 22. The display unit 20 displays characters, graphic symbols, or the like, which are written at a coordinate position detected by the touch panel 24, when the transcription detecting signal transmitted from the pen-type input device 100 is received by the display unit 20.

Further, when a pen tail provided at the other end of the pen-type input device 100 touches the display face 22, an erasure detecting signal is transmitted as a wireless signal. The display unit 20 erases characters, graphic symbols, or the like, which are written at a coordinate position detected by the touch panel 24, when the erasure detecting signal transmitted from the pen-type input device 100 is received by the display unit 20. When this erasure operation is performed, the same color (e.g., white) as the color of a background on the screen is given to the detected coordinate position by a controller 60.

The device accommodating portion 50 accommodates various devices such as a controller, a printer, or a video disk device. Further, a keyboard 30 for performing an input operation is mounted on the upper surface of the device accommodating portion 50.

(Pen-Type Input Device)

Figure 2:
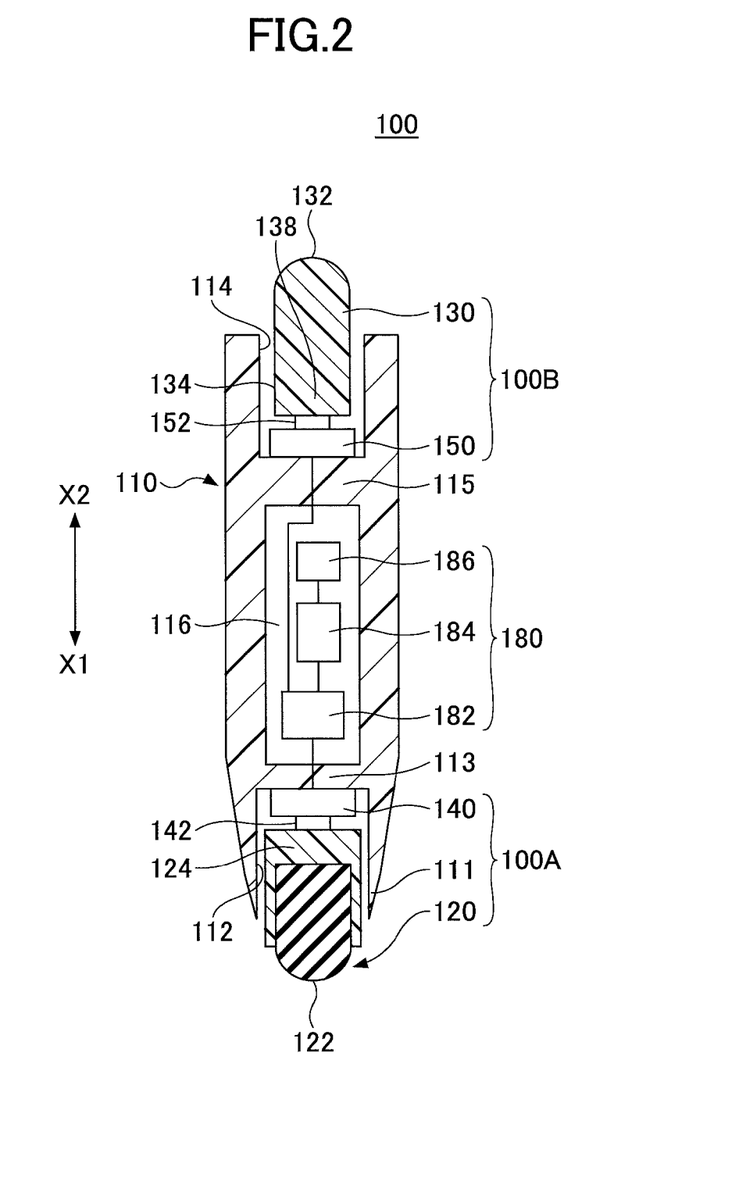
FIG. 2 is a longitudinal cross-sectional view of the pen-type input device of the embodiment.

FIG. 2 is a longitudinal cross-sectional view of the pen-type input device of the embodiment. Referring to FIG. 2, the pen-type input device 100 includes a pen body 110 in a cylindrical shape, a writing unit 100A provided at one end of the pen body 110, and an erasure unit 100B provided at the other end of the pen body 110. In the writing unit 100A, the pen body 110 has a front end recess 112, in which a penpoint movable portion 120 and a penpoint detection switch 140 are accommodated. Further, the erasure unit 100B includes a back end recess 114 in the pen body 110, and a pen tail movable portion 130 and a pen tail detection switch 150, which are accommodated inside the back end recess 114.

The penpoint detection switch 140 and the pen tail detection switch 150 may be a so-called push switch having movable pieces 142 and 152 protruding in axial directions, respectively. The movable piece 142 is separated from the penpoint movable portion 120 interposing a small gap between the movable piece 142 and the penpoint movable portion 120. The movable piece 152 is separated from the pen tail movable portion 130 interposing a small gap between the movable piece 152 and the pen tail movable portion 130. Therefore, the movable piece 142 and 152 are pressed when the penpoint movable portion 120 and the pen tail movable portion 130 move in the axial direction by a distance equal to or greater than a predetermined distance (equal to or greater than the small gap), respectively. When the movable piece 142 and 152 move by a movable range, the penpoint detection switch 140 and the pen tail detection switch 150 are switched from off to on to thereby output a detection signal from the pen-type input device.

One end of the penpoint detection switch 140 is fixed to a partition wall 113 formed in a bottom of the front end recess 112. One end of the pen tail detection switch 150 is fixed to a partition wall 115 formed in a bottom of the back end recess 114. Further, a spring member pressing the movable piece 142 onto a position of switching off the penpoint detection switch 140 is integrated in the penpoint detection switch 140, and a spring member pressing the movable piece 152 onto a position of switching off the pen tail detection switch 150 is integrated in the pen tail detection switch 150.

In the pen-type input device 100, a transmission circuit unit (a transmission part) 180 is accommodated in an internal space 116 of the pen body 110. The transmission circuit unit 180 includes a signal input portion 182, a signal processing portion 184, and a detection signal transmitting portion 186.

Detection signals from the penpoint detection switch 140 and the pen tail detection switch 150 are input into the signal input portion 182. The signal processing portion 184 converts the detection signal input through the signal input portion 182 into a wireless signal. The detection signal transmitting portion 186 transmits the wireless signal (infrared rays) generated by the signal processing portion 184. Although infrared rays are used as the wireless signal within the embodiment, the wireless signal is not limited to the infrared rays and may be a signal of electromagnetic wave, light, or sound wave.

(Structure of Penpoint of Pen-Type Input Device 100)

Figure 3A:
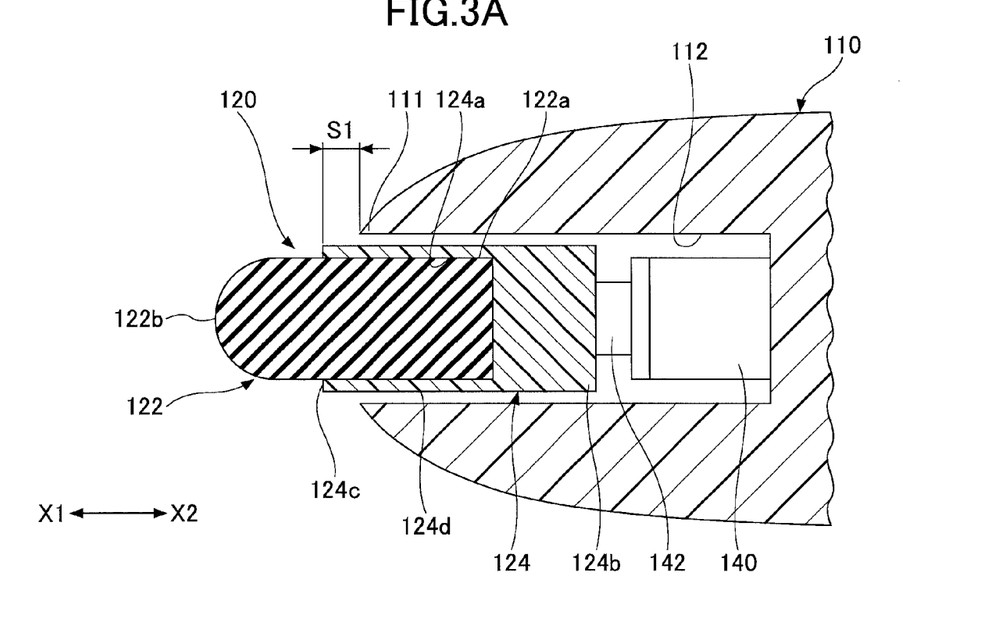
FIG. 3A is a longitudinal cross-sectional view of a penpoint structure of the pen-type input device.
Figure 3B:
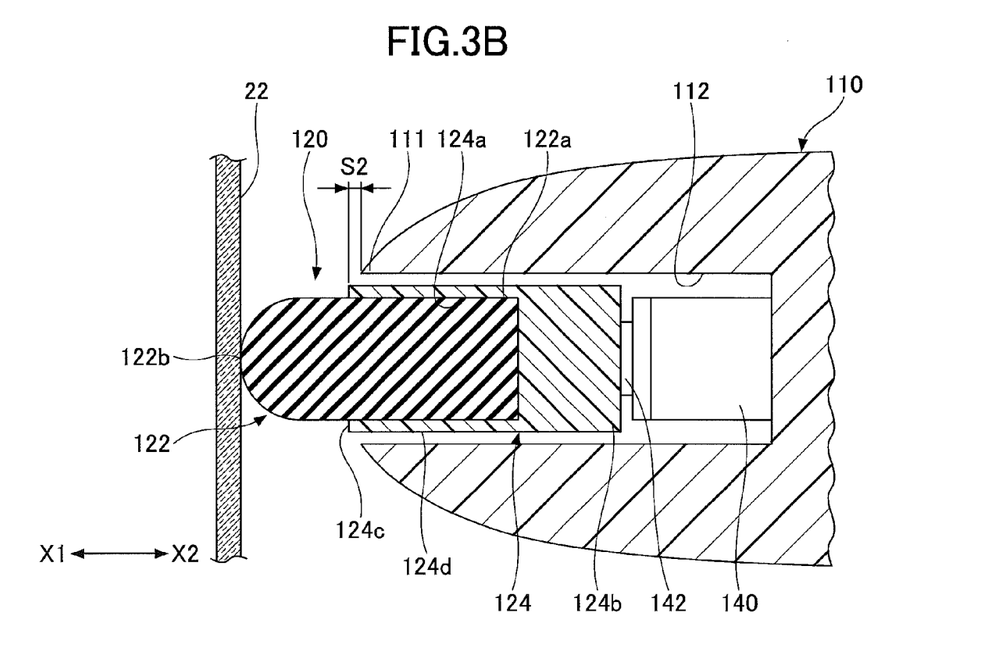
FIG. 3B is a longitudinal cross-sectional view of the penpoint structure of the pen-type input device.

FIG. 3B is a longitudinal cross-sectional view of the penpoint structure of the pen-type input device. Referring to FIG. 3A, the penpoint movable portion 120 is inserted into the front end recess 112 provided in the front end 111 of the pen body 110 so as to be slidably moved in the axial direction (a direction of X1-X2). Further, the penpoint movable portion 120 includes a penpoint member 122 made of an elastic member and a penpoint holding portion 124 into which an outer periphery of the base end portion 122*a* of the penpoint member 122 is fit. A front end portion 112*b* of the penpoint member 122 is shaped like a curved surface (a hemisphere face), and the outer periphery of the base end portion 122*a* of the penpoint member 122 is shaped like a cylindrical column and extends in the direction of X1-X2. Said differently, the penpoint member 122 is shaped like a rod having no step on the outer periphery of the penpoint member 122. Even if an impact is applied after dropping the pen-type input device 100, the penpoint member 122 having improved impact resistance is not broken. It is sufficient for the penpoint member 122 as long as no step is formed on the outer periphery, the penpoint member 122 may be tapered to have a gradient such that an outer diameter of the penpoint member 122 on the front end side is smaller than an outer diameter of the penpoint member 122 on the side of the base end portion 122*a*. In a case where the outer periphery of the penpoint member 122 is tapered, the angle of the gradient of a tapered surface relative to the axis (the central line) of the penpoint member 122 may be equal to or less than about 5°, for example, so that the penpoint member 122, which is fit into the penpoint holding portion 124, can be fixed by a bond.

Further, the penpoint holding portion 124 includes an engaging recess into which the outer periphery of the base end portion 122*a* of the penpoint member 122 fits, and a pressing portion 122*b* of the penpoint member 122 which contacts the movable piece 142 of the penpoint detection switch 140 during the transcribing operation. Further, the engaging recess 124*a* is formed inside the wall portion 124*d* in the cylindrical shape so as to cover the entire periphery of the base end portion of the penpoint member 122.

The elasticity modulus of the penpoint holding portion 124 is higher than the elasticity modulus of the penpoint member 122. Therefore, when the front end portion 122*b* of the penpoint member 122 contacts the display face 22, the penpoint member 122 can deform by force smaller than force enough to deform the penpoint holding portion 124. Said differently, when the contact pressure is applied from the display face 22 to the penpoint member 122, the outer periphery of the penpoint member 122 deforms so as to outward expand earlier than the penpoint holding portion 124.

The penpoint detection switch 140 is switched from "off" to "on" after the movable piece 142 is pressed by the pressing portion 124*b* when the penpoint movable portion is pressed in the direction X2 by contact pressure generated when the penpoint movable portion 120 touches the display face 22. Because a front end portion 124*b* of the penpoint holding portion 124 is pushed in the direction X1 by the movable piece 142 when the penpoint detection switch is switched off, the front end side end portion 124*b* protrudes from the front end recess 112 of the pen body 110 on the side of the front end in the direction X1. This protruding length S1 is, for example, S1=2 to 3 mm.

The materials of the penpoint member 122 and the penpoint holding portion 124 are described next.

The penpoint member 122 is made of plastic sintered madreporite obtained by sintering rubber grains or resin grains having elasticity. For example, it is preferable to use sintered plastic that is molded as the penpoint member 122. This sintered plastic may be obtained by sintering plastic powders such as Low Density Polyethylene (LDPE), High Density Polyethylene (HDPE), or Polypropylene (PP).

Further, the porosity of sintered plastic can be controlled by adjusting the pressing pressure, the sintering temperature, and the sintering time at a time of molding. It is possible to set the elasticity modulus and the strength to be a predetermined value by adjusting the porosity.

Further, the penpoint member 122 may be made of rubber such as Natural rubber (NR), Polychloroprene (CR), Nitrile rubber (NBR), Ethylene Propylene Rubber (EPDM), Butyl rubber (IIR), polyurethane (U), fluoro rubber (FKM), Silicone rubber (VMQ).

As described, the penpoint member 122 is preferably made of a material (e.g., the above rubber, resin, plastic sintered madreporite, or foamed plastic) simultaneously having appropriate hardness and appropriate softness in order to optimize feeling in causing the front end portion 122*b* to touch the display face 22 and write feeling.

The penpoint holding portion 124 is made of a resin or a metal having a rigidity higher than that of the penpoint member 122. The material of the penpoint holding portion 124 is preferably ABS resin, PC resin, or a metal such as alloy of ABS/PC, iron, stainless.

Referring to FIG. 3B, when the front end portion 122*b* of the penpoint member 122 touches the display face 22, the penpoint member 122 is pressed in the direction of X2 due to the contact pressure. Therefore, the penpoint member 122 moves in the direction of X2 together with the penpoint holding portion 124. At this time, the moving distance of the penpoint member 122 and the penpoint holding portion 124 is the same as the movable range where the movable piece 142 of the penpoint detection switch 140 is switched from "off" to "on". The movable range where the movable piece 142 of the penpoint detection switch 140 is switched from "off" to "on" is less than protruding length S1.

Therefore, if the penpoint member 122 is pressed in the direction X2 by the contact pressure to switch the movable piece 142 of the penpoint detection switch 140 from "off" to "on", the front end portion 124c of the penpoint holding portion 124 is protruded on the side of the front end portion 122b relative to the front end recess 112 of the pen body 110. At this time, the protruding length S2 is, for example, about 0.05 mm to 2 mm, preferably about 0.1 mm to 1 mm. As described, in a case where the compressive load acts on the penpoint member 122 by the contact pressure, the wall portion 124d outside the engaging recess 124a of the penpoint holding portion 124 protrudes from the front end recess 112 of the pen body on the side of the front end portion.

Next, the protruding length S2 is described. For example, when the protruding length S2 is long, the protruding length of the penpoint of the penpoint member 122, which is a length of a portion of the penpoint member 122 protruding from the front end recess 112 of the pen body 110, becomes long. When the protruding length of the penpoint is long, a distance between a position where an operator holds the pen body 110 and a position where the penpoint member 122 touches the display face 22 becomes long. In this case, a variation of a writing position during writing becomes too great to cause uncomfortable feeling in writing. Therefore, it is necessary to shorten the length of the penpoint member 122 in order to increase the protruding length S2 of the penpoint holding portion 124 and decrease the length of the penpoint. In this case of shortening the penpoint member 122, flexibility of the penpoint member 122 like a cushion is low. Therefore, there occurs a problem that write feeling becomes hard such that a back action at the time when the penpoint member 122 touches the display face reaches a hand of an operator.

Then, if a material having a low elasticity modulus is used for the penpoint member 122, a portion of the penpoint member 122 protruding from the front end portion 124c of the penpoint holding portion 124 on the side of the front end portion 122b (in the direction X1) expands in a radius direction when the penpoint member 122 receives the contact pressure by being pressed against the display face 22. However, a portion of the penpoint member 122 on a side of the base end (in the direction X2) relative to the front end portion 124c of the penpoint holding portion 124 is held by the penpoint holding portion 124 having the rigidity higher than that of the penpoint member 122 so as not to expand in the radius direction. Said differently, because the write feeling is softened in the penpoint movable portion 120, if the portion of the penpoint member 122, which protrudes on the side of the front end portion 122b from the penpoint holding portion 124, expands on the side of the outer periphery, the pen-type input device 100 is structured so that the deformed (expanded) part does not interfere with the front end recess 112 of the pen body 110.

(Evaluation Test Result of Materials for Penpoint Member 122 and Penpoint Holding Portion 124)

The above described materials for the penpoint member 122 and the penpoint holding portion 124 were tested in order to compare the deformation of the penpoints and the write feeling during transcription. Here, the elasticity modulus of a sintered plastic as the material of the penpoint members 122 is set to be 100 MPa to 300 MPa, where write feeling is assumed to be good, by adjusting the porosity. This test includes an evaluation of durability against repeated inputs into the penpoint movable portion 120 of the pen-type input device 100 and an evaluation of deformation caused by a drop of penpoint movable portion 120 of the pen-type input device 100. Further, an organoleptic evaluation was performed to evaluate the write feeling. Results of this test is shown in Table 1.

TABLE 1

|  |  | ELASTICITY MODULUS | MATERIAL OF PENPOINT MEMBER PLASTIC SINTERED MADREPORITE(PE) | | | | | |
|---|---|---|---|---|---|---|---|---|
|  |  |  | 50 MPa | 100 MPa | 150 MPa | 200 MPa | 250 MPa | 300 MPa |
| MATERIAL OF PENPOINT HOLDING PORTION | PC + ABS | 2.1 GPa | Δ (DEFORMATION) | ○ (WRITE WELL) | ○ (WRITE WELL) | ○ (WRITE WELL) | Δ (WRITE HARD) | Δ (WRITE HARD) |
|  | ABS-GF30 | 8.9 GPa | Δ (DEFORMATION) | ○ (WRITE WELL) | ○ (WRITE WELL) | ○ (WRITE WELL) | Δ (WRITE HARD) | Δ (WRITE HARD) |
|  | GENERAL ROLLED STEEL PLATE (SS400) | 206 GPa | Δ (DEFORMATION) | ○ (WRITE WELL) | ○ (WRITE WELL) | ○ (WRITE WELL) | Δ (WRITE HARD) | Δ (WRITE HARD) |

As a result of the evaluation in the above test, it was known that when the elasticity modulus of the penpoint member 122 is low (for example, about 50 MPa), the penpoint holding portion 124 did not deform but the penpoint member 122 did extremely deform to show a high degree of deformation. Further, under a high load, the penpoint member was broken.

On the other hand, when the elasticity modulus of the penpoint member 122 is high (for example, about 250 MPa to 300 MPa), obtained were many evaluations that a back action caused when the penpoint member touched the display face 22 was directly transferred to the hand of the operator and therefore the write feeling is hard.

It was known from these results illustrated in Table 1 that the material of the penpoint holding portion 124 had no problem if the elasticity modulus of the material is about 2.1 GPa or if a material having a higher elasticity modulus than 2.1 GPa was used.

Further, the elasticity modulus of the material of the penpoint member 122 was preferably in a range of 50 MPa to 300 MPa, more preferably in a range of 100 MPa to 200 MPa.

(Electronic Information Board System)

Figure 4:
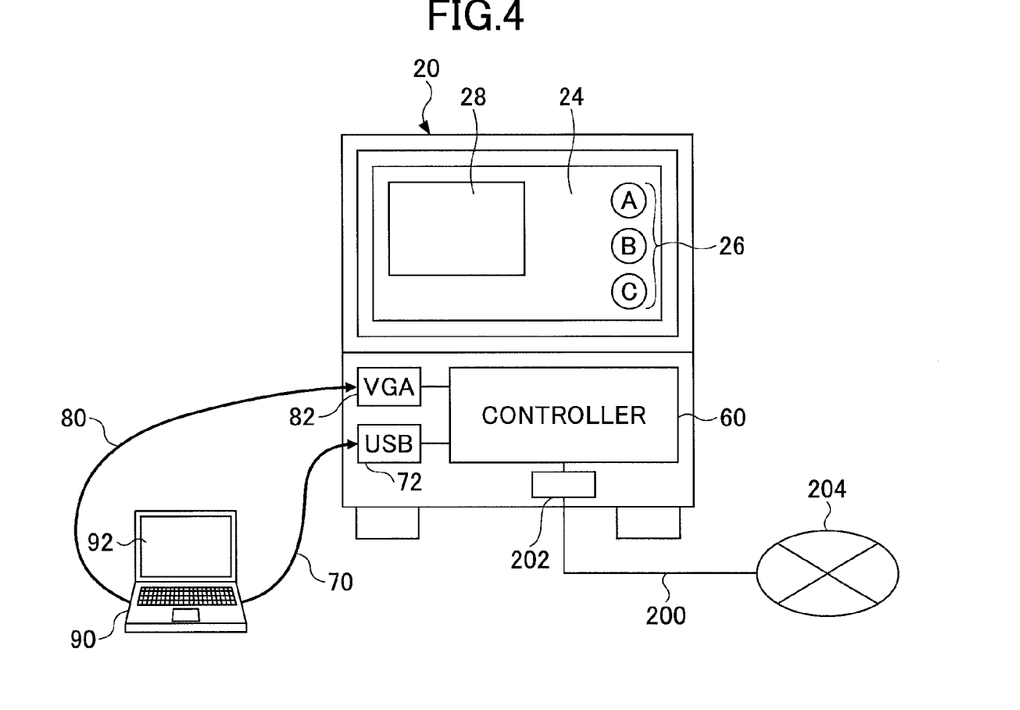
FIG. 4 schematically illustrates a control system of the electronic information board.
Figure 5:
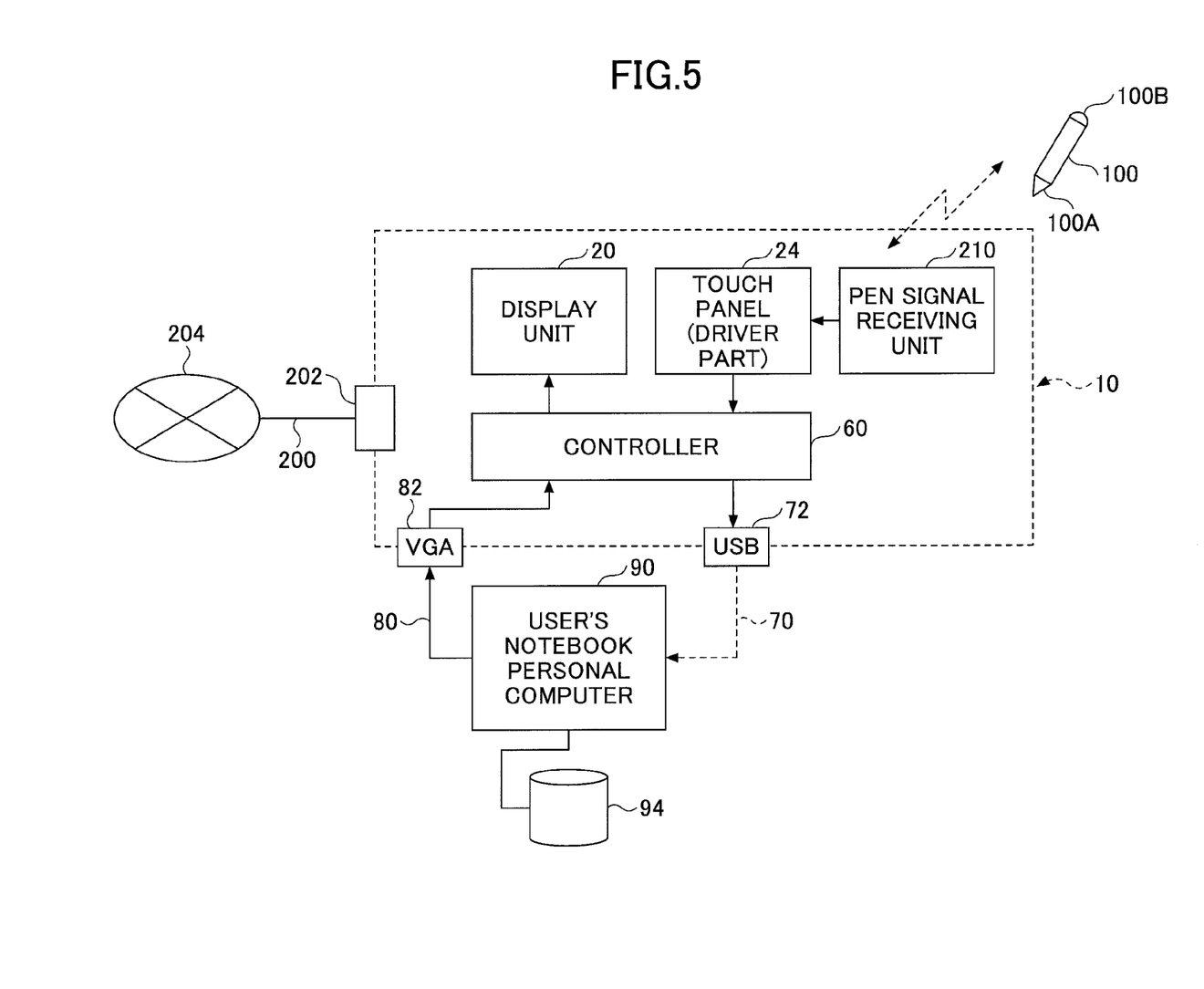
FIG. 5 schematically illustrates a portion of the electronic information board system.

FIG. 4 schematically illustrates a portion of an electronic information board system. FIG. 5 is a block diagram schematically illustrating a control system of the electronic information board. Referring to FIGS. 4 and 5, the display unit 20 is controlled by the controller 60, and various screen operating parts 26 to be operated and an image taken from a user PC 90 are displayed in the display face 22.

Further, the controller 60 includes a USB socket, with which a universal serial bus (USB) cable 70 is connected, and a VGA input socket 82, with which a video graphic array (VGA) cable 80 is connected.

The user personal computer (PC) is connected with the controller 60 through the USB socket 72 the VGA input socket 82. Further, the user PC 90 includes a storage 94 such as a magnetic disk device. The storage 94 stores various contents and a program such as application software for displaying contents. The operator selects a desired content among the contents stored in the storage 94 and the selected content is displayed on a monitor 92.

Therefore, when image data displayed on the monitor 92 of the user PC 90 is transferred from the user PC 90 through the USB cable 70 and the VGA cable 80 to the controller 60, the controller 60 causes the image corresponding to the image data displayed on the monitor 92 to be displayed on the user PC screen 28 of the display unit 20.

Further, the controller 60 is connected with a communication line 200 such as an optical fiber and a network 204 such as the Internet or a local area network (LAN) through a network socket 202.

Further, as illustrated in FIG. 5, the electronic information board system 10 includes a pen signal receiving unit 210 for receiving a detection signal transmitted from the pen-type input device 100. This pen signal receiving unit 210 sends the detection signal to the touch panel 24 when the pen signal receiving unit 210 receives the detection signal sent from the pen-type input device 100. With this, a touch panel driver part, which is a control circuit of the touch panel 24, recognizes that an input operation by the pen-type input device 100 is performed upon the receipt of the detection signal transmitted from the pen-type input device 100 and outputs the detection signal to the controller 60.

(Control System of Electronic Information Board)

Figure 6:
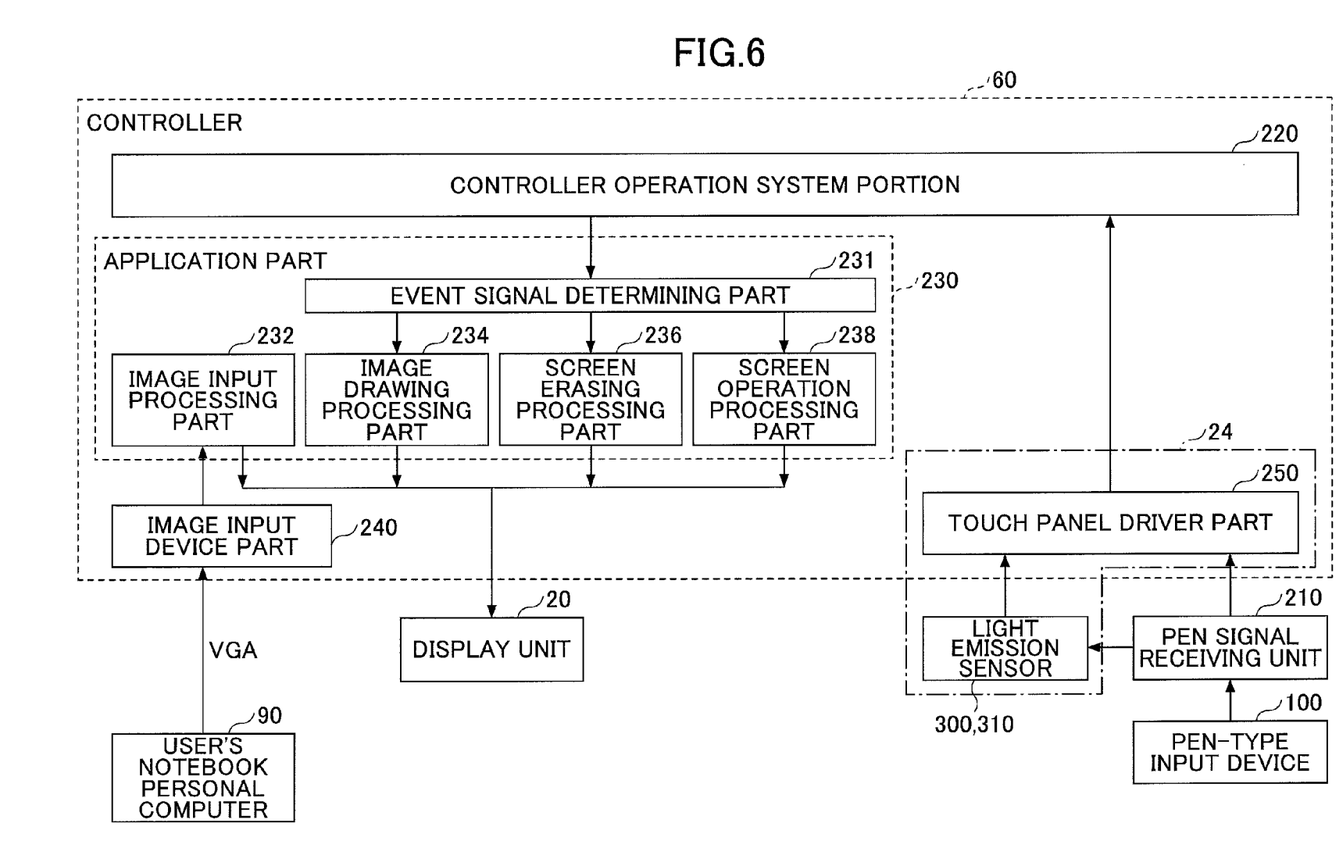
FIG. 6 is a block diagram illustrating a structure of a controller of the electronic information board.

FIG. 6 is a block diagram illustrating the structure of the controller of the electronic information board. Referring to FIG. 6, the controller 60 of the electronic information board system 10 includes a pen signal receiving unit 210, a controller operation system portion 220, an application part 230, an image input device part 240, and a touch panel driver part 250. Further, the application part 230 includes an event signal determining part 231, an image input processing part 232, an image drawing processing part 234, a screen erasing processing part 236, and a screen operation processing part 238.

The controller operation system portion 220 is a main control unit for managing and executing a control process performed by the controller 60.

The application part 230 performs a control process of generating an entire image to be displayed on the display face 22 of the display unit 20, a control process of causing the image to be displayed on the user PC screen 28, and a control process of displaying transcribed graphic symbols and characters when a transcription detecting signal from the pen-type input device 100 is detected.

The event signal determining part 231 monitors an event signal input from the controller operation system portion 220, and performs a control process corresponding to the input event signal.

The image input processing part 232 performs a control process for displaying the image input from the user PC 90 on the user PC screen 28 on the display face 22.

The image drawing processing part 234 generates a handwritten graphic based on the data of coordinate positions input from the touch panel 24 through the event signal determining part 231, superposes the handwritten graphic on the image already displayed, and displays the image having the superposed handwritten graphic on the display face 22.

The image erasing processing part 236 generates a graphic of a background color of the image which is currently displayed based on the information of coordinate positions input from the touch panel 24 through the event signal determining part 231, superposes the graphic of the background color on the image already displayed, and displays the image having the superposed graphic on the display face 22. With this, the graphic of the background color is superposed on the handwritten graphic displayed on the display unit 20 to seemingly erase the handwritten graphic from the display face 22.

The screen operation processing part 238 converts the information (a signal) of coordinate position input from the touch panel 24 to a pointing device signal such as a mouse event and perform a process by turning on or off the screen operating parts 26 displayed on the display face 22 of the display unit 20. Further, the screen operation processing part 238 transfers the information of the coordinate position, at which the pen-type input device 100 touches the display face 22 and which is detected by light emission sensor 300 and 310 provided to send light and receive the light in the touch panel 24, as a mouse down event together with the coordinate value to the controller operation system portion 220. Further, in a case where the pen-type input device 100 is moved while the pen-type input device 100 touches the display face 22 of the touch panel 24, the screen operation processing part 238 transfers the information of the coordinate position as a mouse up event together with the coordinate value to the controller operation system portion 220.

The touch panel driver part 250 converts the coordinate position signal, the transcription detecting signal, and the erasure detecting signal, which are input from the pen-type input device 100 and the touch panel 24, to a predetermined event signal and transfers the converted signal to the controller operation system portion 220. Further, the touch panel driver part 250 transfers the coordinate position signal and any one of the transcription detecting signal and the erasure detecting signal to the controller operation system portion 220 when the transcription detecting signal or the erasure detecting signal is received by the pen signal receiving unit 210.

[Method of Detecting Coordinate by Pen-Type Input Device]

Figure 7:
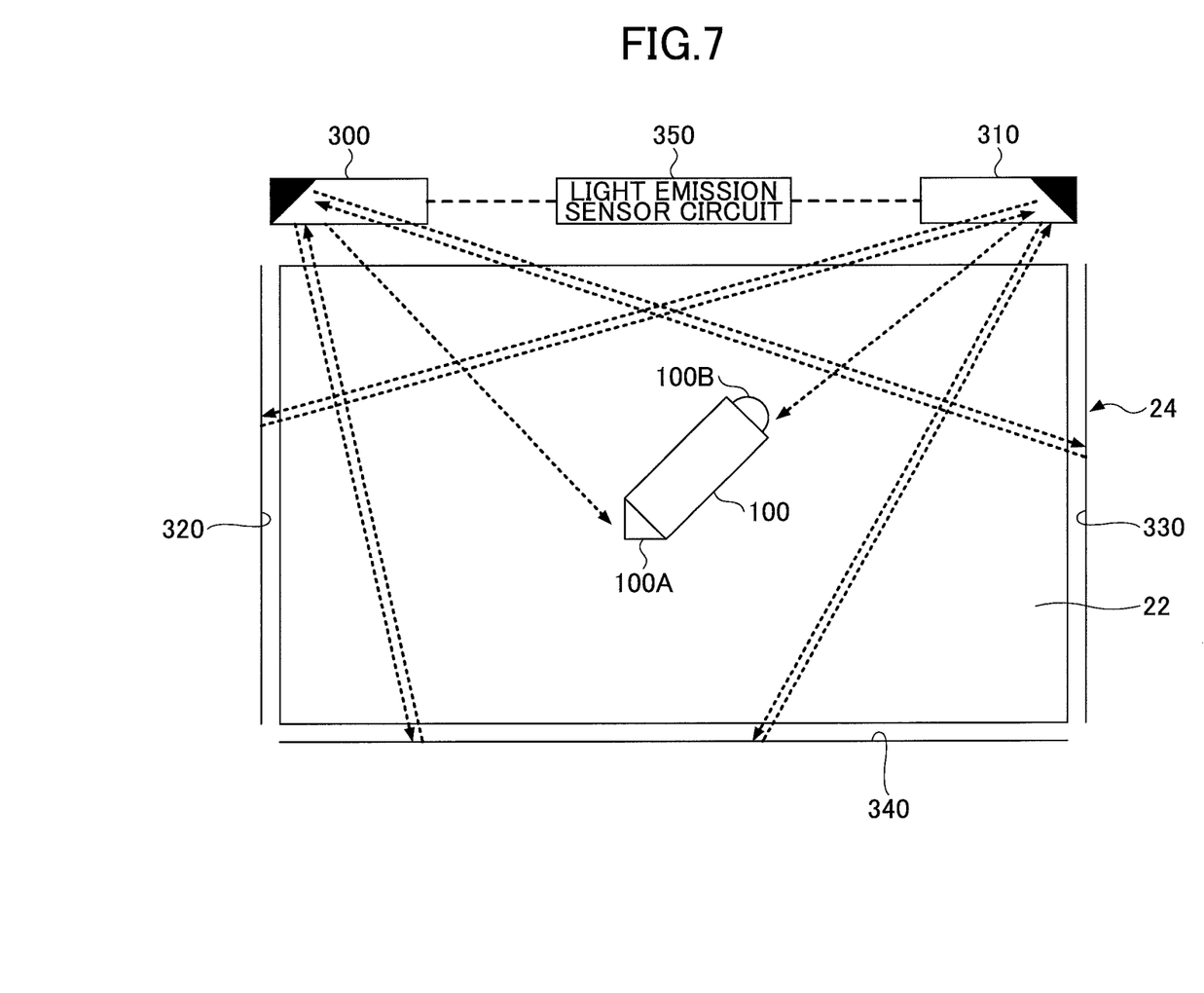
FIG. 7 illustrates a structure of a touch panel which detects a coordinate position.

FIG. 7 illustrates a structure of a touch panel which detects a coordinate position. Referring to FIG. 7, a pair of light emission sensors 300 and 310 is arranged at upper left and upper right corners on the display face 22 of the touch panel 24, respectively. Reflection plates 320, 330, and 340 are arranged on the left side, the right side, and the lower side of the display face 22, respectively.

The light emission sensor 300 arranged at the upper left corner emits infrared rays along a perpendicular plane parallel to the display face 22. The directions of emitting the infrared rays are entirely toward the reflection plate 330 on the right side and the reflection plate 340 on the lower side. The light emission sensor 310 arranged at the upper right corner emits infrared rays along the perpendicular plane parallel to the display face 22. The directions of emitting the infrared rays are entirely toward the reflection plate 320 on the left side and the reflection plate 340 on the lower side.

In a case where nothing touches the display face 22, the infrared rays emitted from the light emission sensors 300 and 310 are reflected by the reflection plates 320, 330, and 340, and the reflected light is received by the light emission sensor 300 and 310.

Here, in a case where the penpoint movable portion 120 or the pen tail movable portion 130 touches the display face 22, the infrared rays emitted from the light emission sensors 300 and 310 are blocked at the position where the penpoint movable portion 120 or the pen tail movable portion 130 touches the display face 22. Then, the light emission sensor circuit 350 detects the angle of the gradient of the position where the infrared rays are blocked relative to the horizontal direction based on detection signals from the light emission sensors 300 and 310, calculates the coordinate position using a formula for triangular surveying, and converts this coordinate position to an XY coordinate. A signal indicative of the coordinate position obtained by the light emission sensor circuit 350 is transferred through the controller operation system portion 220 to the image drawing processing part 234, the screen erasing processing part 236, and the screen operation processing part 238.

(Method of Operating Pen-type Input Device 100)

Figure 8:
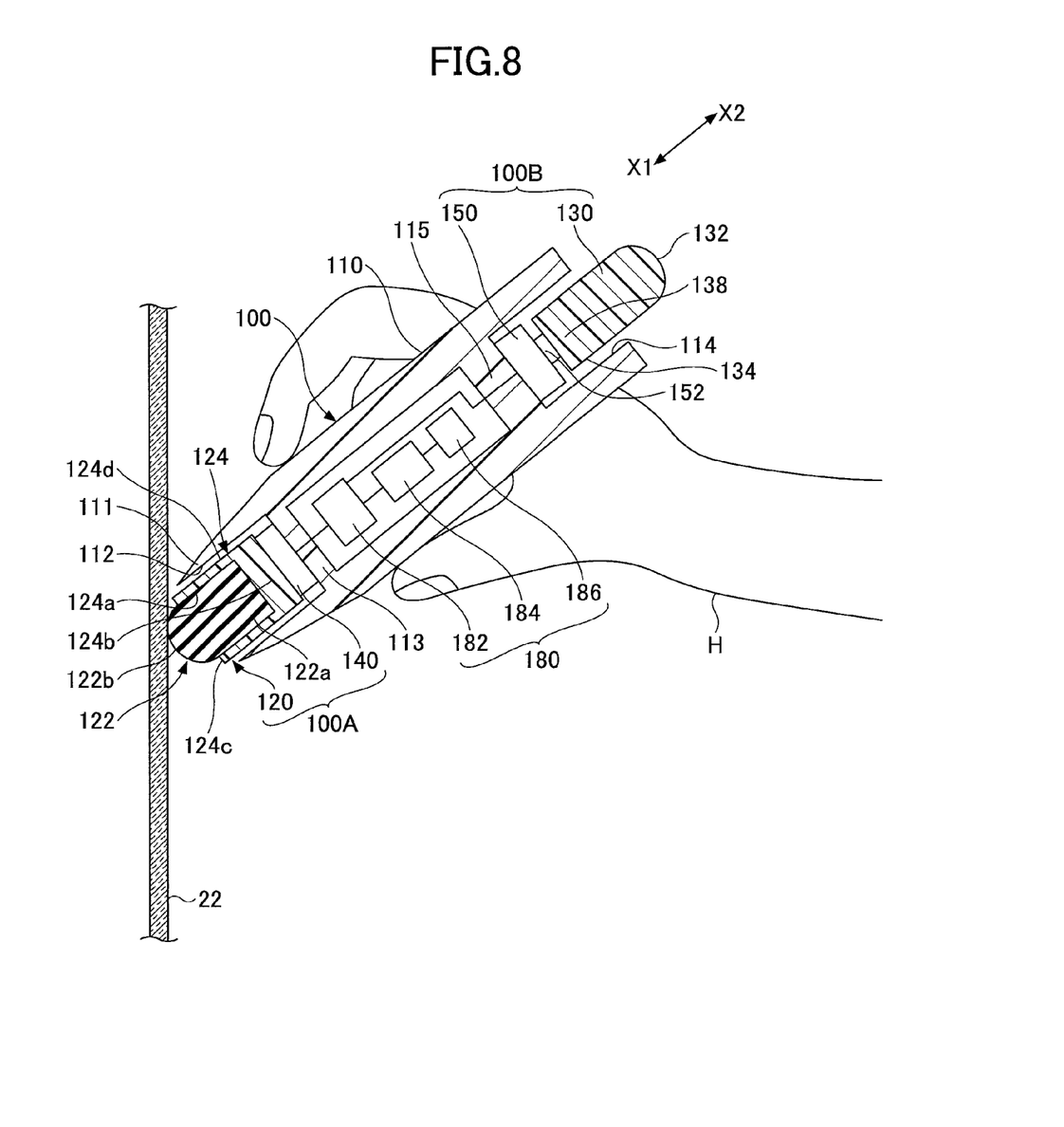
FIG. 8 schematically illustrates a case where a writing unit of the pen-type input device of the embodiment of the present invention touches a display face.

FIG. 8 schematically illustrates a case where the writing unit of the pen-type input device of the embodiment of the present invention touches the display face. Referring to FIG. 8, a hand H of the operator holds an outer periohery of a middle portion in the axial direction of the pen-type input device, the penpoint member 122 of the penpoint movable portion 120 in the pen-type input device 100 is caused to touch the display face 22 of the display unit 20, and the pen body 110 is pressed onto the side of the display face 22. Then, the penpoint movable portion 120 slides inside the front end recess 112 of the pen body 110 in the direction X2, and the pressing portion 124b of the penpoint holding portion 124 presses the movable piece 142 of the penpoint detection switch 140 until the movable piece 142 reaches the position for switching "on". Thus, the penpoint detection switch 140 is switched "on", and outputs the transcription detecting signal. Then, this transcription detecting signal is converted by the transmission circuit unit 180 to a wireless signal and is transmitted.

As described above, when the pen-type input device 100 is moved while the penpoint detection switch 140 is switched on, the contact position of the penpoint movable portion 120 moves to thereby cause the handwritten characters or graphic symbols to be displayed on the display face 22. At this time, the front end portion 122b of the penpoint member 122 protruding on the side of the front end portion of the pen body 110 slides on the display face 22 while the front end portion 122b is deformed by receiving the contact pressure.

Here, the state of deformation of the penpoint member 122 is described.

Figure 9A:
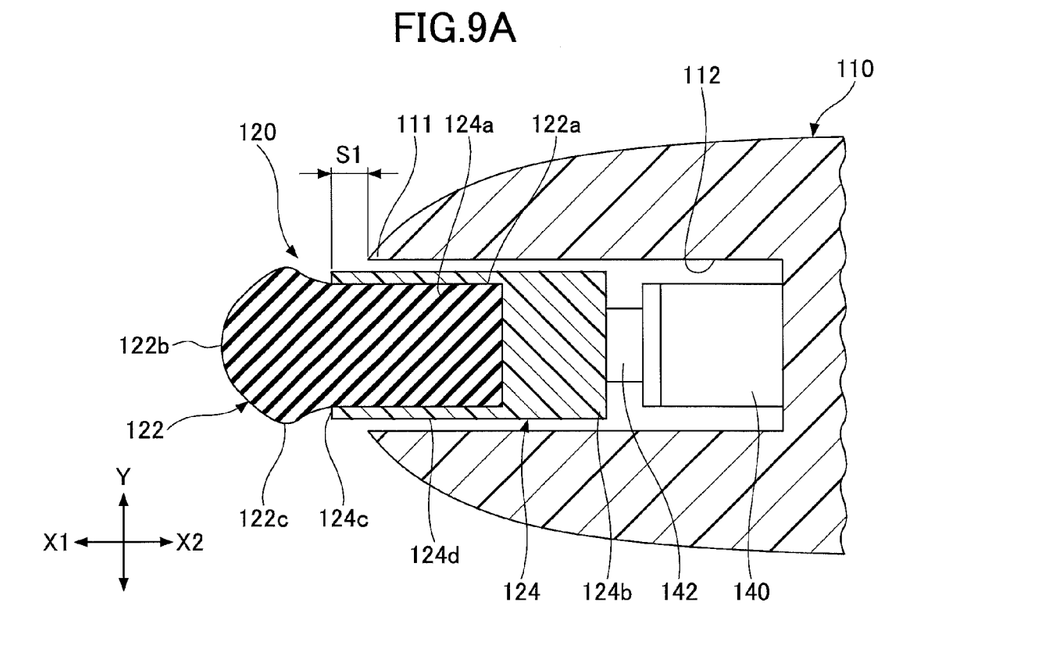
FIG. 9A illustrates deformation of a penpoint movable portion of the pen-type input device.
Figure 9B:
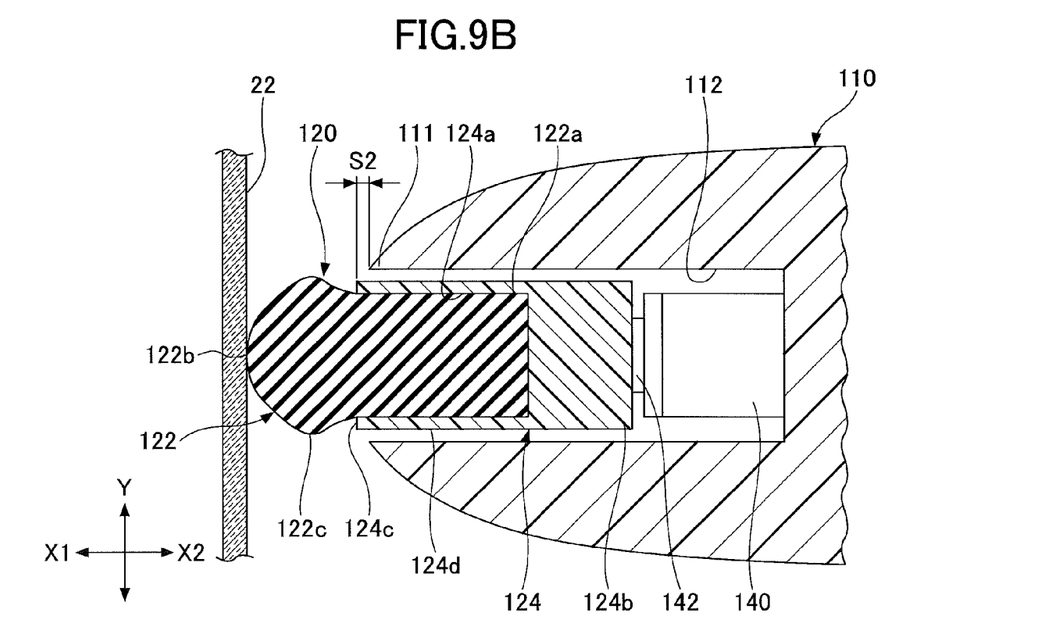
FIG. 9B illustrates deformation of the penpoint movable portion of the pen-type input device.

FIGS. 9A and 9B illustrate deformation of the penpoint movable portion of the pen-type input device. Referring to FIGS. 9A and 9B, when the front end portion 112b of the penpoint member 122, which is the front end of the penpoint movable portion 120, in the pen-type input device 100 touches the display face 22, the contact pressure effects on the penpoint member 122 having elasticity. Therefore, after the penpoint member 122 repeatedly receives compressive load in the directions X1 and X2, the outer peripheral portions protruding from the penpoint holding portion 124 gradually deforms in a radius direction (the direction Y) perpendicular to the axial direction. Referring to FIG. 9A, illustration of the deformation of the bulging portion 122c is exaggerated for easy understandings.

Because the base end portion 122a of the penpoint member 122 fits into the engaging recess 124a of the penpoint holding portion 124 having a rigidity higher than the penpoint member 122 thereby restricting the deformation, the outer peripheral side of the front end portion 122b protruding from the engaging recess 124a deforms so as to expand in radius directions (the direction Y). Thus, the bulging portion 122c is formed. As described, when the outer peripheral side of the front end portion 122b of the penpoint member 122 deforms in the radius directions by the contact pressure against the display face 22, the outer diameter of the bulging portion 122c gradually increases greater than the outer diameter of the wall portion 124d of the penpoint holding portion 124.

Referring to FIG. 9B, in a case where a transcribing operation is performed using the penpoint member 122, which is deformed, the front end portion 122b of the penpoint member 122 touches the display face 22 thereby receiving the compressive load in the axial direction (the directions X1 and X2). Then, the penpoint movable portion 120 moves in the direction X2 to press the movable piece 142 of the penpoint detection switch 140. At this time, the bulging portion 122c expanding in the radius directions (the direction Y) is formed at the front end portion 122b of the penpoint member 122 on the side of the front end portion (the side of the direction X1) relative to the penpoint holding portion 124.

Therefore, the bulging portion 122c does not contact the front end recess 112 of the pen body 110 to thereby prevent the penpoint movable portion 120 from being inoperative. Therefore, in the pen-type input device 10, even if the bulging portion 122c is formed in the penpoint member 120, the penpoint movable portion 120 does not become inoperative, and the penpoint detection switch 140 can be switched "on" or "off". As described, the pen-type input device 10 can be continuously used and the lifetime can be prolonged.

Although the pen-type input device used in the electronic information board system 10 is exemplified in the embodiment, the present invention is not limited to this and can be applied to an input device for a display apparatus having another touch panel or a terminal apparatus.

Further, although the structure that the writing unit is provided at one end of the pen-type input device and the eraser unit is provided at the other end is exemplified in the embodiment, the present invention is not limited to this structure. For example, a writing unit enabled to select a plurality of colors may be provided instead of the eraser unit.

Within the embodiment, because the penpoint holding portion having the rigidity higher than that of the penpoint member fits into the outer periphery of the base end portion of the penpoint member to restrict the deformation of the outer periphery of the base end portion of the penpoint member, even if the contact pressure repeatedly effects on the penpoint member, it is possible to prevent the outer periphery of the base end portion from deforming in the radius directions, and simultaneously the feeling in causing the penpoint member to be touched with the display face is not too hard or too soft and the write feeling becomes good. Furthermore, by employing a shape of step around the outer periphery of the penpoint member, even when an impact on the penpoint member at a time of dropping the pen-type input device applied, the penpoint member is prevented from being broken.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the pen-type input device has been described in detail, it should be understood that various changes, substitutions, and alterations could be made thereto without departing from the spirit and scope of the invention.

This application is based upon and claims the benefit of priority of the prior Japanese Patent Application No. 2013-019209, filed on Feb. 4, 2013, the entire contents of which are incorporated herein by reference.

What is claimed is:

1. A pen-type input device comprising:
   a body shaped like a pen;
   a penpoint movable portion inserted into a front end recess included in the body, the penpoint movable portion slidably moving in a longitudinal axial direction of the pen-type input device; and
   a transmission part which transmits a detecting signal of a contact position when the penpoint movable portion is caused to touch a display face of an electronic information board,
   wherein the penpoint movable portion includes
      a penpoint member, which is made of an elastic member and includes a front end portion caused to touch the display face, the penpoint member being in a tapered shape having a gradient relative to an axis of the penpoint member such that an outer diameter of the penpoint member is smaller on a side of the front end portion than on a side of a base end portion of the penpoint member, and
      a penpoint holding portion, which has a rigidity higher than that of the penpoint member, fits around an outer periphery of the base end portion of the penpoint member, and holds the penpoint member so as to prevent deformation of the outer periphery of the base end portion of the penpoint member toward the front end recess in a radius direction of the pen-type input device perpendicular to the longitudinal axial direction of the pen-type input device, and
      wherein the penpoint holding portion of the penpoint movable portion protrudes, both at a time when the pen-type input device is used to write and a time when the pen-type input device is in a storage state, from the front end recess included in the body on a side of the front end portion of the penpoint movable portion in the longitudinal axial direction of the pen-type input device, and intervenes, both at the time when the pen-type input device is used to write and the time when the pen-type input device is in the storage state, between the front end recess and the penpoint member in the radius direction of the pen-type input device to prevent contact between the front end recess and the penpoint member.

2. The pen-type input device according to claim 1, wherein the penpoint holding portion of the penpoint movable portion protrudes less from the front end recess included in the body on the side of the front end portion of the penpoint movable portion while the penpoint member does not touch the display face.

3. The pen-type input device according to claim 1, wherein, in the penpoint holding portion, the front end portion of the penpoint member touches the display face, and
when the detecting signal is transmitted from the transmission part, a front end portion of the penpoint holding portion is positioned on a side of the front end portion of the penpoint member.

4. The pen-type input device according to claim 1, wherein an elasticity modulus of the penpoint holding portion is higher than an elasticity modulus of the penpoint member.

5. The pen-type input device according to claim 1, wherein the penpoint member is made of a plastic sintered madreporite formed by sintering rubber grains or resin grains, and
the penpoint holding portion is made of a resin material or a metal having a rigidity higher than that of the plastic sintered madreporite.

6. An electronic information board system comprising:
the pen-type input device according to claim 1;
a display unit including the display face which the pen-type input device is caused to touch;
a coordinate detecting part which detects a coordinate where the pen-type input device touches the display face; and
a controller which causes to display a graphic corresponding to the touch of the pen-type input device at the coordinate position detected by the coordinate detecting part.

7. The pen-type input device according to claim 1, wherein the penpoint member is made of the elastic member having an elasticity modulus within the range of 100 to 200 MPa.

8. The pen-type input device according to claim 1, wherein the penpoint member is made of the elastic member having an elasticity modulus within the range of 50 to 300 MPa.

9. The pen-type input device according to claim 1, wherein an angle of the gradient of the tapered shape relative to the axis of the penpoint member being equal to or less than 5°.

10. The pen-type input device according to claim 1, the pen-type input device further comprising:
a movable piece disposed between the penpoint holding portion and the transmission part,
wherein a gap is interposed between the movable piece and the penpoint holding portion at the time when the pen-type input device is in a storage state.

11. The pen-type input device according to claim 1, wherein a gap is interposed between an outer wall of the penpoint holding portion and an inner wall of the front end recess.

12. The pen-type input device according to claim 1, wherein the penpoint holding portion extends along a majority of an entire length of the penpoint member.

* * * * *